United States Patent [19]

Martin

[11] Patent Number: 5,008,895
[45] Date of Patent: Apr. 16, 1991

[54] PACKAGING DEVICE FOR DIODE LASER PUMPED ASSEMBLY

[75] Inventor: Danny W. Martin, St. Charles, Mo.

[73] Assignee: Laser Diode, Inc., Earth City, Mo.

[21] Appl. No.: 475,232

[22] Filed: Feb. 5, 1990

[51] Int. Cl.⁵ .............................................. H01S 3/09
[52] U.S. Cl. ........................................ 372/69; 372/75
[58] Field of Search .................................... 372/36, 75

[56] References Cited

U.S. PATENT DOCUMENTS

| | | | |
|---|---|---|---|
| 4,805,177 | 2/1989 | Martin et al. | 372/36 |
| 4,837,771 | 6/1989 | Baer | 372/75 |
| 4,864,584 | 9/1989 | Martin | 372/36 |

*Primary Examiner*—Leon Scott, Jr.
*Attorney, Agent, or Firm*—Haverstock, Garrett & Roberts

[57] ABSTRACT

A package for the components of a laser device that includes an elongated laser medium, a pump source adjacent to one side of the laser medium and laser mirrors positioned in alignment with the optical axis of the laser medium, the package including a planar heat conducting structure including a base member with a cavity formed on one side and a platform at an intermediate location for supporting the laser elements, and a closure member for closing the cavity around the laser elements, and a multi-conductor connection cable mounted in the package having connections to the pump source and to a source of electrical energy.

17 Claims, 2 Drawing Sheets

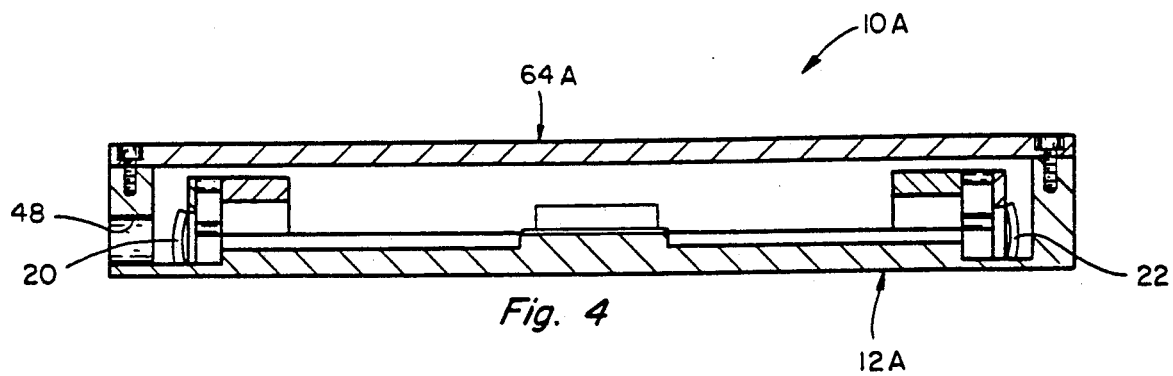
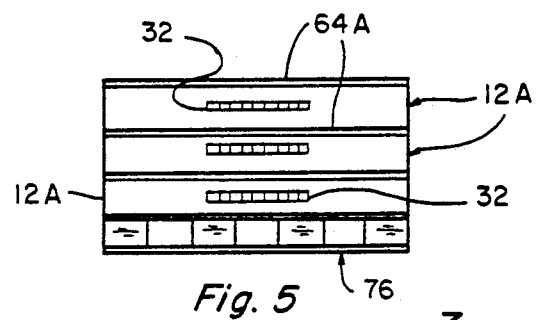
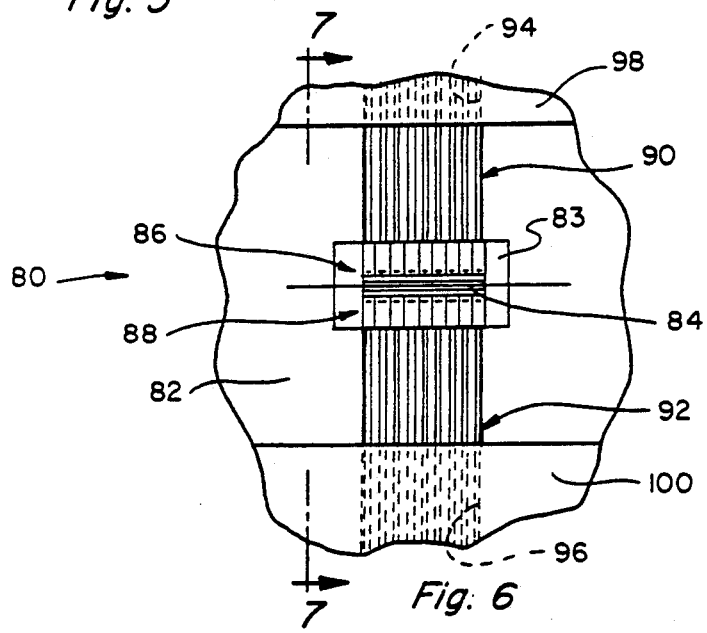
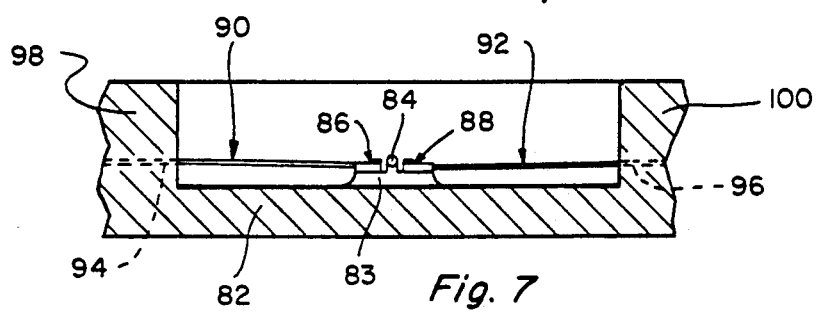

PACKAGING DEVICE FOR DIODE LASER PUMPED ASSEMBLY

BACKGROUND OF THE INVENTION

The present invention resides in novel housing or packaging means for a laser device and particularly laser devices that use side pumping from excited laser diodes into a crystal or other gain medium. The present housing represents an important advancement to devices such as the laser devices disclosed in Applicant's U.S. Pat. Nos. 4,805,177, issued Feb. 14, 1989 and 4,864,584, issued Sept. 5, 1989. The present housing or packaging provides improved means for making the electrical connections to certain of the laser elements such as to the laser diode pump sources, it provides a relatively compact, flat rugged design, it provides adjustable mirror holders and mounts, and the subject package is able to be mounted on thermoelectric coolers and associated heat sinks located outside of the sealed enclosure of the subject means to provide means for maintaining a desired laser operating temperature. The present construction uses a one piece sculptured resonator base plate which serves as the main support for the elements of the laser, a one piece closure member, and the device employs means for adjusting the alignment of the mirrors, which adjustment mean can be controlled using external inputs thus enabling even a small amount of mirror misalignment to be compensated for and by means that can be made to operate automatically in real time. The present construction lends itself to use with lasers operating in several modes including in continuous wave mode (CW) which is an important advantage in some applications. The relatively flat construction of the subject laser housing also enables a plurality of similarly housed lasers to be arranged in a stacked configuration and held together by common fasteners if desired.

DESCRIPTION OF THE PRESENT INVENTION

The present invention resides in a laser housing or package having a relatively flat base plate or resonator preferably of one piece construction and formed with means for supporting a laser crystal or other gain medium and adjacent diode lasers arranged to pump energy into the side of the medium. The resonator or base plate has countersunk or sculptured portions arranged so as to be on the axis of the laser medium, it has means at opposite ends of the housing for supporting and adjusting the mirrors and mirror mountings, and it has means at the side of the resonator for attaching electrical connection means such as a strip line connection cable through which all of the electrical energy for operating the laser passes. The present laser package includes a cover which has dimensions which complement the resonator, and the cover is suitably sculptured with cavities to accommodate the laser elements including the mirrors. The present invention therefore teaches the construction of a relatively flat rugged housing or package on which and in which a laser is installed so it will operate in an efficient manner and under optimum conditions and yet in a condition in which the mirrors and mirror mounts can be adjusted by automatic or external means if they become out of alignment. The present packaging is also constructed to be mounted on suitable thermoelectric coolers and associated heat sink means so that the heat generated during operation of the laser is effectively and efficiently carried away and dissipated.

It is a principle object of the present invention to provide improved means for packaging a laser device that includes an active laser medium or crystal, pump means such as laser diode pump means which are mounted to pump energy into the medium and laser mirrors.

Another object is to teach the construction of relatively rugged, compact packaging for a laser device.

Another object is to enable the use of multiple-lead electrical cables such as strip line connectors for supplying energy to operate a laser.

Another object is to provide packaging for a laser which includes means for mounting the laser mirrors and associated adjustable mounting means for the mirrors.

Another object is to teach the construction of packaging means for a laser device which maintains alignment of the laser elements even when the device is exposed to a relatively wide range of operating conditions including temperature conditions.

Another object is to teach the construction of a package for a laser which is rugged, can be installed and used in many conditions and environments and is constructed to protect the laser elements against damage.

Another object is to teach the construction of packaging for a laser which is relatively flat and compact and can be arranged in a stacked relationship with other similarly packaged lasers.

These and other objects and advantages of the present invention will become apparent to those skilled in the art after considering the following detailed specification of preferred embodiments in conjunction with the accompanying drawings.

BRIEF DESCRIPTION OF THE DRAWINGS

FIG. 4 is a cross-sectional view similar to FIG. 2 but showing another form of the base plate with a closure member installed thereon;

FIG. 5 is a side elevational view showing a plurality of packaged lasers similar to that shown in FIG. 4 arranged in a stacked condition;

FIG. 6 is a fragmentary top plan view similar to a portion of the device shown in FIG. 1 but showing another modified embodiment of the subject device; and FIG. 7 is a cross-sectional view taken along line 7—7 of FIG. 6.

DESCRIPTION OF THE PREFERRED EMBODIMENT

Figure 1:
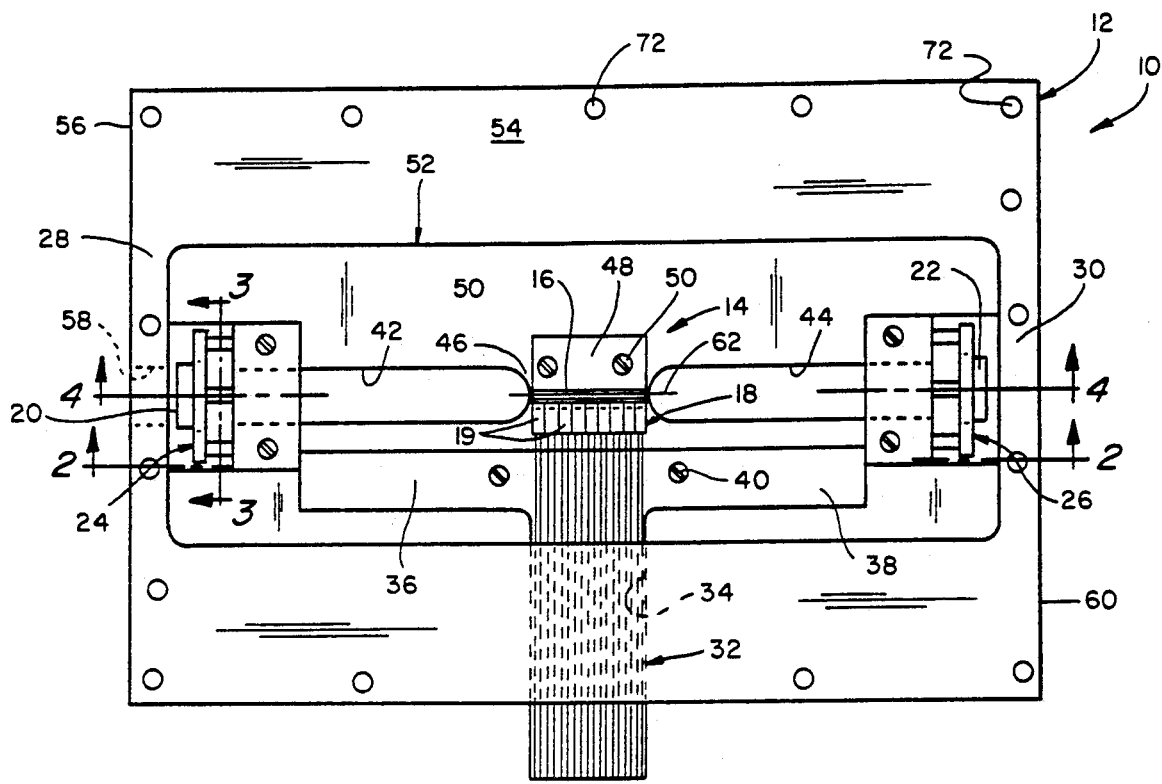
FIG. 1 is a top plan view of a resonator base plate which forms part of a package for the elements of a laser, the base plate being shown in an open condition.

Referring to the drawings more particularly by reference numbers, number 10 refers to a packaged laser including a resonator base plate 12 with the elements of laser assembly 14 mounted thereon. The laser assembly 14 includes a crystal or other gain medium 16 and pump means including an array of laser diodes 18 mounted on associated heat sinks 19 and positioned on the base plate 12 to pump energy into the side of the gain medium 16.

The additional elements mounted on the base plate 12 include spaced mirrors 20 and 22 including respective mirror mounting means 24 and 26. The laser also includes electrical connection means to the pump sources 18 shown in the form of strip line connector 32 mounted on or in the base plate 12 adjacent to one side in position to have connections made to laser diodes or sets of the laser diodes in the array 18. The connections can be made in a manner such as shown in U.S. Pat. No. 4,864,584.

It is contemplated to have a similar strip line connector located in each opposite side of the base plate 12 in which case a similar but opposed set or array of laser diodes would be mounted on each opposite side of the gain medium 16 to pump energy into the medium from opposite directions as shown in FIG. 6. Alternatively one or more sides of the gain medium can be flattened and positioned adjacent to a polished surface to reflect the pump energy impinging thereon and passing therethrough back through the gain medium 16 to increase the absorption and hense the pumping efficiency. Such a construction is shown in Martin U.S. Pat. No. 4,805,177.

The strip line connector 32 may be bonded to the resonator base plate 12 using an adhesive to make it more secure and the base plate 12 can have a groove 34 or opening for the strip line 28 to extend through. Usually this is done after the conductors in the strip line 32 have been connected to the respective sets of laser diodes in the array 18. The strip line 32 is shown having elongated support portions or wings 36 and 38 which extend in both opposite directions therefrom along the base plate 12 and are shown attached to the base plate to make them secure, by adhesive or by threaded screws or other members 40 as shown.

The base plate 12 as shown in FIG. 1 has spaced elongated aligned countersunk portions or channels 42 and 44 which extend endwardly along the axis of the laser medium or crystal 16. This means that an elevated space 46 will be formed between the channels 42 and 44, and this space 46 is available to be used to support the laser elements or a mounting member 48 on which the laser medium 16 and the pump source 18 are mounted. Threaded members 50 may be used for attaching the mounting member 48 to the base plate 12. The base plate 12 also has a larger shallower recessed area 52 which extends from adjacent opposite sides and ends thereof, and the channels 42 and 44 are formed in the recessed area 52. This construction for the base plate provides a relatively large flat peripheral area 54 around the upper surface of the base plate 12. The flat peripheral surface 54 mates with a complementary flat surface area on a closure member which will be described later.

The space between the recessed area 52 and the left end surface 56 of the resonator base plate 12 as shown has an opening or window 58 formed therethrough which is aligned with the axis of the medium 16 and the output of the laser is projected through the window 58. The opposite or right end 60 of the laser base plate 12 is closed since no laser energy is emitted from this end.

It is also contemplated to reduce in size or eliminate altogether the recesses 42 and 44 and in the alternative mount the laser elements on a raised portion or platform on the recess 52 (see FIGS. 6 and 7). The important thing is that the axis 62 of the laser medium 16 be provided with sufficient space taking into account how broad or divergent the beam is as it passes back and forth before exiting through the window 58.

Figure 2:
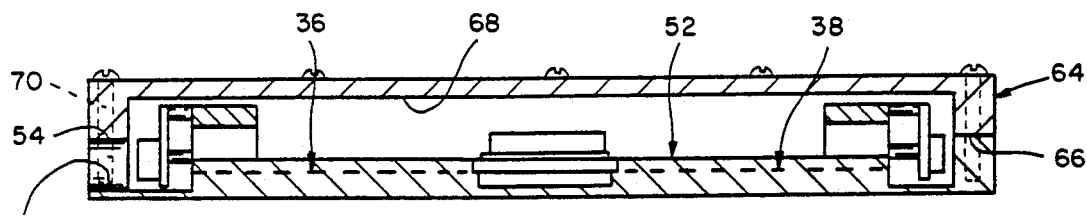
FIG. 2 is a cross-sectional view of the same device shown in a closed condition by a closure member and taken along line 2—2 of FIG. 1.

To complete the assembly of the package for the laser 10 there is provided a cover or closure member 64 shown in FIG. 2 which has a surface 66, that mates with the flat peripheral surface 54 of the laser base plate 12 forming a sealed or substantially sealed condition therebetween A gasket or other sealant can be used between the surfaces 54 and 66 if desired. The cover 64 may have a similar recessed or countersunk portion 68 which matches in outline the recessed area 52 in the base plate 12 to form a substantially closed space for accommodating the laser elements including the mirrors when the device is closed. The cover 64 can be fixedly attached to the base plate 12 by means of a plurality of spaced threaded members 70 which extend into aligned bores 72, positions for which are shown in FIG. 1.

Figure 3:
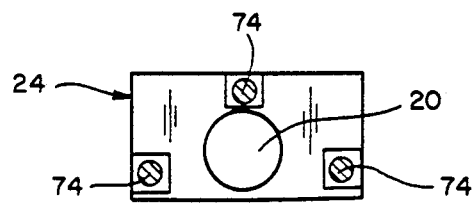
FIG. 3 is a cross-sectional view taken on line 3—3 of FIG. 1.

The mirror mounting means 24 and 26 for mounting the respective mirrors 20 and 22 include adjustable means 74 (FIG. 3) for aligning the respective mirrors. These can include threaded adjustment means 74. Positions for three such adjustment means are shown in FIG. 3. Automatic adjustment means can also be provided, if desired.

In FIG. 4 a modified form 10A of the construction is shown with the base member identified by number 12A and the cover by number 64A. Except for modification in the shape of these members, the structure is basically the same and operates the same as the structure shown in FIGS. 1 and 2.

As explained, the present invention resides in a novel package or housing for a laser device such as for a side pumped laser device, which packaging is rugged, sealed, easily adjustable, relatively compact and flat for ease of stacking and storage, and it has improved means for attaching or making the electrical connections to the active elements by means of a multiple-lead electrical cable, such as the strip line cable 32. Lasers of the type to be packaged by the present packaging means are usually relatively small fragile devices and the packaging provided by the present construction lends itself to being made to be physically small and rugged so as to protect the elements from damage and to make it usable in small spaces. Once the entire package has been assembled and bolted or otherwise connected, and sealed if desired, it can be mounted on well known thermoelectric coolers or like devices (see cooler 76 in FIG. 5) in association with heat sink means (not shown) which can be installed at one or more convenient locations for maintaining a desired operating temperature. Lasers packaged according to the invention can be operated intermittently or in a continuous wave (CW) mode as required. The present construction also lends itself to use without a heat sink or special cooling means being required, the only limitation when so operating is the ability to connect the strip line connector to a suitable power source. This is a significant advantage because it means that the subject packaged lasers can be operated in satellites and in space vehicles where space is limited and where portable power sources are all that is available.

The openings 72 through the base plate 12 may also be extended through the closure members 64 so that when arranged in a stacked condition the same threaded members can be used to hold together and mount a plurality of similar laser assemblies in a small compact space. The same threaded members can also be used to attach one or more of the laser assemblies to thermoelectric cooler means and associated heat sinks which can be mounted at suitable locations on the laser assemblies.

FIGS. 6 and 7 show a modified construction 80 in which the base plate 82 has a raised central platform 83 on which gain medium 84 and the rows or arrays of diode lasers which form pump sources 86 and 88 are mounted on opposite sides of the medium. In this construction similar strip line connections 90 and 92 are provided and extend through suitable openings or grooves 94 and 96 in the respective opposite side walls 98 and 100 of the base plate 82. The laser medium 84 in this case as in the other construction can be a single elongated crystal medium such as a medium formed of Nd/YAG, Nd Glass and YLF or it can be formed by two such mediums arranged in back to back condition and separated by a layer of reflective material therebetween. The advantage of such a two element crystal medium is to enable the laser to produce two distinctly different laser beam outputs from the same device.

Thus there has been shown and described a novel laser housing or packaging construction which fulfills all of the objects and advantages sought therefor. It will become apparent to those skilled in the art, however, that many changes, modifications, variations and other uses and applications for the subject device are possible, and all such changes, modifications, variations and other uses and applications which do not depart from the spirit and scope of the invention are deemed to be covered by the invention which is limited only by the claims which follow.

What is claimed is:

1. A package for a laser device, being arranged in a stack of similar packages and attached to a thermo-electric cooler comprising a base member of relatively planar heat conducting construction having an outer surface extending between spaced and opposed sides and end surfaces, an inner surface portion opposed to said outer surface and having a platform portion and a container extending therearound, said platform being formed thereon at a location intermediate the sides and end surfaces on which are positioned the elements of a laser including a laser medium and a laser pump source, laser mirrors including mountings therefor mounted on the base member and optically aligned with the laser medium, the laser medium including an elongated member mounted on said platform portion and having an optical axis intersecting the end surfaces at intermediate locations therealong, the pump source including an array of laser diodes positioned on the platform adjacent to one side of the laser medium, such that said diodes pump laser energy into the laser medium thereby causing said laser medium to lase, electrical connection means mounted in the base member including a strip line connector having a plurality of conductors for connection at corresponding ends to selected ones of said laser diodes in said array and to a source of energy for applying energy from said source to said laser diodes to cause them to lase, a closure member having a surface in abutting relation to said inner surface of the base member to enclose a space around the elements of the laser, and means for attaching said closure member to said base member thereby providing a compact, rugged heat conducting package.

2. The package of claim 1 including a window through the base member adjacent one end surface in alignment with the optical axis of the laser medium.

3. The package of claim 1 including a second array of laser diodes mounted on the platform portion in opposed relation to the laser pump source.

4. The package of claim 3 including second electrical connection means mounted in base member for connecting the energy source to the second array of laser diodes.

5. A package for a laser device comprising:
a closed container of heat conductive material having mating first and second portions defining a substantially enclosed container, said container including an intermediate platform on the first container portion,
an elongated laser medium mounted on the platform in position having an optical axis intersecting opposite sides of the container,
a pump source including multi-lead connector means mounted on the first container portion for connecting said pump source to a source of electric energy, said pump source being positioned adjacent to one side of said laser medium thereby causing said laser medium to lase,
and mirror means including mirror mounting means mounted in the container in alignment with the optical axis of the laser medium thereby providing a compact, rugged, heat conducting package.

6. The laser device of claim 5 wherein the pump source is an array of laser diodes.

7. The laser device of claim 6 wherein said multi-lead connector means has leads connected to the respective arrays of laser diodes.

8. The laser device of claim 7 wherein the connector means is a multi conductor strip line.

9. The laser device of the claim 5 wherein at least one portion of the container is a relatively flat metal member.

10. The laser device of claim 5 including a window through one side of the container in alignment with the optical axis of the laser medium.

11. The container of claim 5 wherein a second pump source is located on the platform adjacent the opposite side of the laser medium from the pump source.

12. The container of claim 11 including a second electrical connector means mounted in the first container portion for connecting the second pump source to an external source of electrical energy.

13. The container of claim 11 wherein the laser medium is formed by two adjacent elongated crystals with a reflective surface positioned therebetween.

14. The container of claim 5 wherein the elongated laser medium is constructed of a material selected from the group that includes ND/YAG crystal, ND Glass, and TLF.

15. The container of claim 5 including a thermoelectric cooler having spaced opposite surfaces one of which is in contact with one of the opposite surfaces of the first container portion.

16. The container of claim 7 including a plurality of similar container arranged in a stacked relationship, and means for connecting the stacked containers together.

17. A package for the elements of a laser device, said elements including: an elongated laser medium, a pump source adjacent to one side of the laser medium and laser mirrors positioned in alignment with the optical axis of the laser medium, the package comprising:
a planar heat conducting structure including a base member with a container formed on one side and a platform at an intermediate location for supporting said laser elements, a closure member for closing the container around said laser elements, and a multi-conductor connection cable mounted in the package having connections to the pump source and to a source of electrical energy.

* * * * *

UNITED STATES PATENT AND TRADEMARK OFFICE
CERTIFICATE OF CORRECTION

PATENT NO. : 5,008,895
DATED : April 16, 1991
INVENTOR(S) : Danny W. Martin

It is certified that error appears in the above-identified patent and that said Letters Patent is hereby corrected as shown below:

Column 1, lines 46 & 47, "en-ergy" should be --energy--.

Column 4, line 6, after "therebetween" and before "A", insert a period --.--.

Signed and Sealed this

Eighteenth Day of August, 1992

Attest:

DOUGLAS B. COMER

*Attesting Officer*  *Acting Commissioner of Patents and Trademarks*